July 29, 1941.  W. M. AHLSTROM ET AL  2,250,739
MEASURING AND CALCULATING APPARATUS
Filed Aug. 5, 1938    5 Sheets-Sheet 1

William Ahlstrom,
Richard J. Tischler, and
Frank H. Parsons INVENTORS

BY Haugood and Van Horn
ATTORNEYS

July 29, 1941. W. M. AHLSTROM ET AL 2,250,739
MEASURING AND CALCULATING APPARATUS
Filed Aug. 5, 1938 5 Sheets-Sheet 2

William Ahlstrom, Richard J. Tischler
and Frank H. Parsons
INVENTORS BY Hawgood and Van Horn
ATTORNEYS July 29, 1941.  W. M. AHLSTROM ET AL  2,250,739
MEASURING AND CALCULATING APPARATUS
Filed Aug. 5, 1938   5 Sheets-Sheet 4

Patented July 29, 1941

2,250,739

UNITED STATES PATENT OFFICE 2,250,739

MEASURING AND CALCULATING APPARATUS

William M. Ahlstrom, Mentor, and Richard J. Tischler and Frank H. Parsons, Fairport Harbor, Ohio Application August 5, 1938, Serial No. 223,284

8 Claims. (Cl. 235—61)

This invention relates to measuring and calculating apparatus which may be employed for many purposes, as will become apparent in the succeeding description.

An object of the invention is to provide an improved apparatus which will automatically and accurately perform certain kinds of mathematical computations.

Another object is to provide an improved apparatus which may be operated by relatively small forces.

Another object is to provide an improved apparatus which will operate accurately throughout the entire range of the device.

Another object is to provide an improved apparatus which will automatically and accurately solve problems in multiplication and division.

Another object is to provide an improved apparatus which will accurately indicate the flow of fluids.

Another object is to provide an improved apparatus which will be responsive to variations in fluid flow throughout a wide range.

Another object is to provide an improved apparatus which may be easily manufactured.

Another object is to provide an improved apparatus which will be neat and compact.

Another object is to provide an improved apparatus which will clearly indicate results of its calculation.

Another object is to provide an improved apparatus which may be easily installed in conjunction with existing equipment.

Another object is to provide an improved apparatus which will consist of few and rugged parts.

Another object is to provide an improved apparatus in which wear of the parts will be reduced to a minimum.

Other objects will hereinafter appear.

The invention will be better understood from the description of several practical embodiments thereof illustrated in the accompanying drawings, in which.

In Figures 1 and 13 to 16 inclusive is illustrated a device particularly intended for use in conjunction with internal combustion engines upon automotive vehicles, or in other places where it is desired to compare the amount of a liquid, such as a fuel consumed, with the speed of some piece of apparatus such as a motor operated thereby, as, for instance, in obtaining the number of miles per gallon at which an engine driven vehicle is operating.

In the following description of the apparatus of these figures, it will be assumed that the measurements taken are in terms of gasoline being consumed by an engine in gallons per hour and in miles per hour of vehicle speed, although, of course, it will be apparent that the precise apparatus of these figures might be used for making comparisons of many other kinds, where it is desired to compare amount of fluid with some other variable, and also that the apparatus for comparing the two variables might well be used entirely apart from the apparatus for measuring fluid flow, these two parts of the invention constituting sub-combinations of the main combination of Figure 1.

Figure 1:
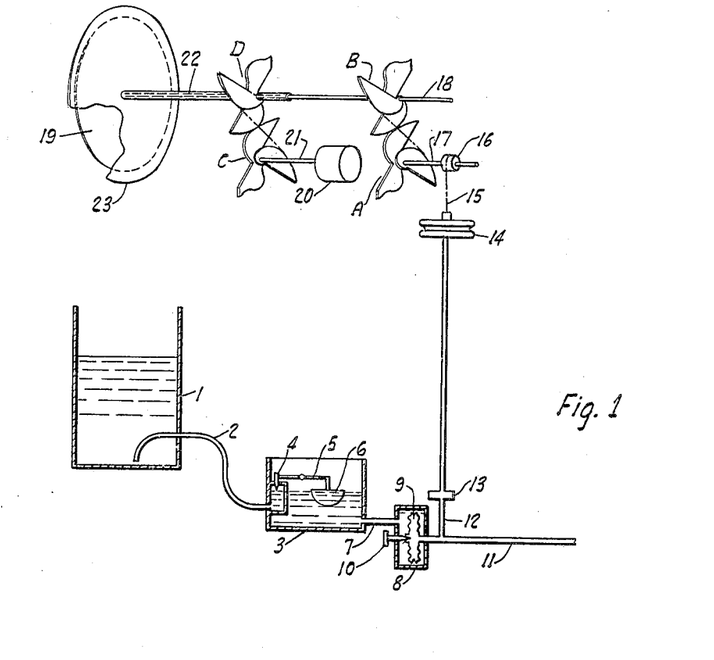
Figure 1 is a diagrammatic illustration of parts embodying the invention applied to an instrument for use in conjunction with the operation of internal combustion motors, as, for instance, upon automotive vehicles.
Figure 2:
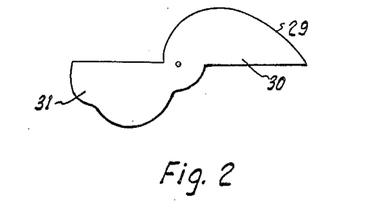
Figures 2 to 7 are somewhat diagrammatic illustrations of the cam mechanism of Figure 1.
Figure 3:
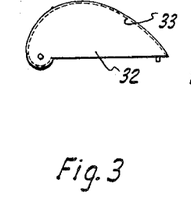
Figure 4:
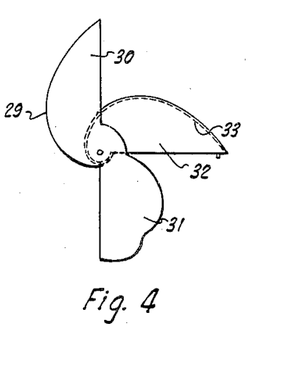

In Figure 1, fuel such as gasoline is stored in a tank indicated at 1 from which it may be conducted by a pipe 2 to an auxiliary tank or float chamber 3, the level of the liquid in the float chamber being controlled by a valve 4 mounted on one end of a pivoted lever 5, to the other end of which is secured a float 6.

From the float chamber the liquid may pass through a pipe or conduit 7 to a casing 8 containing a pressure responsive device such as a bellows 9 and an adjustable orifice area controlling valve 10 arranged as hereinafter described, the fluid passing from the exterior of the bellows to its interior, and thence through a pipe or conduit 11 to the engine, as being connected to its carburetor (not shown) in a manner well understood in the art.

Figure 10:
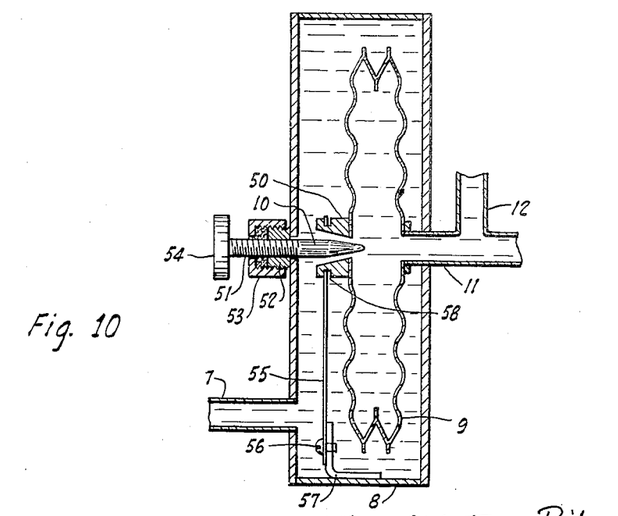
Figure 10 is a central sectional view of the fluid flow responsive device of Figure 1, the casing 8 being shown as rotated through a half revolution from the position in which it is indicated in the first figure.
Figure 11:
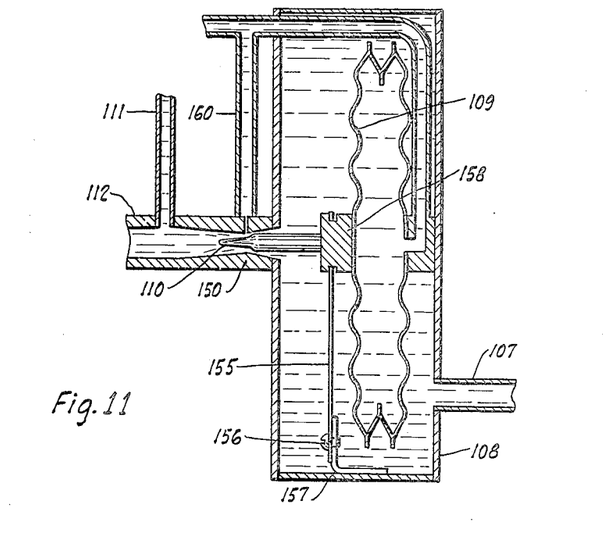
Figure 11 is a similar view of another embodiment in a fluid flow responsive device.

The bellows 9 and valve 10 are so adjusted that the pressure of the liquid in conduit 11 is directly proportional to the volume flowing through the conduit 11 per unit time, as will be more fully pointed out in the descriptions of Figures 10 and 11.

Conduit 11 has connected thereto an upwardly extending pipe or conduit 12 which is expanded at 13 into a chamber at about the level of the liquid in float chamber 3, and which serves to prevent surging of the liquid upwardly through conduit 12.

At the upper end of conduit 12 is provided a pressure responsive device shown as a bellows 14 connected by a flexible band 15 to a drum 16 fixed on a shaft 17 carrying a cam A.

Cam A drives a corresponding cam B fixed to a shaft 18. Upon the end of shaft 18 is a dial 19.

The cams A and B are so designed and arranged that, while the drum 16 is moved angularly in direct proportion to the change in pressure in conduit 12, dial 19 is angularly displaced in accordance with the logarithm of this motion. The cams themselves are described in more detail in conjunction with the description of Figures 2 to 7.

At 20 is shown an element which may be angularly moved in accordance with the speed of the vehicle, such, for instance, as the magnetically actuated drum of a conventional speedometer, which is mounted on a shaft 21 provided with a cam C similar to cam A and driving a cam D similar to cam B, the latter being fixed to a tubular shaft 22 surrounding shaft 18 and provided on its end with a dial 23 projecting radially beyond the edge of dial 19. It will be apparent that, if drum 20 is rotated in direct proportion to the speed of the vehicle, dial 23 is rotated in proportion to the logarithm of this speed.

Of course, the mileage per unit of fuel obtained by the vehicle is equal to the miles per hour being traveled divided by the number of gallons consumed per hour, and as the two dials indicate, respectively, the gasoline consumption per hour and the miles per hour of the vehicle, and are moved in proportion to the logarithms of these variables, it is apparent that, with suitable logarithmic scales indicated on the dials, the quotient or number of miles per gallon being traveled at any instant may be directly read.

Figure 14:
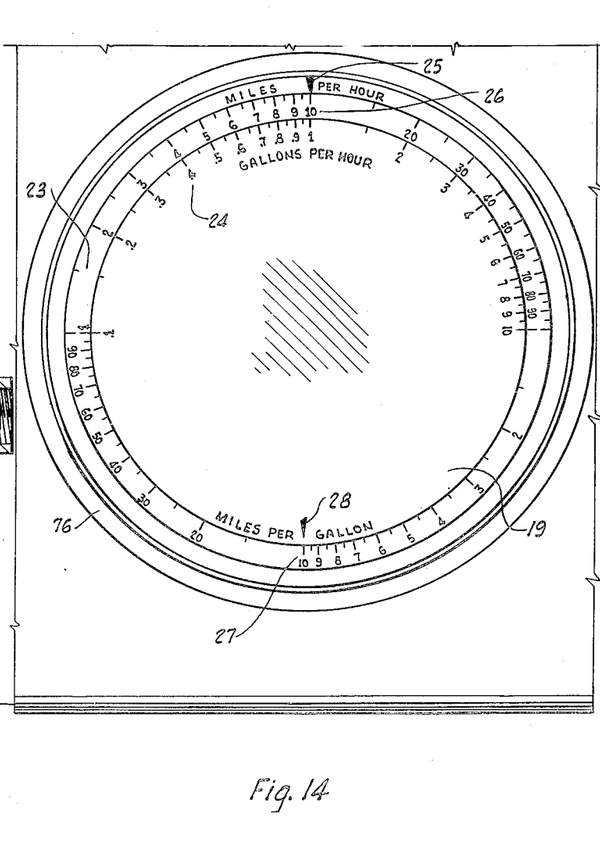
Figure 14 is a front elevational view of the device of Figure 13, taken on the line XIV—XIV of Figure 13.
Figure 15:
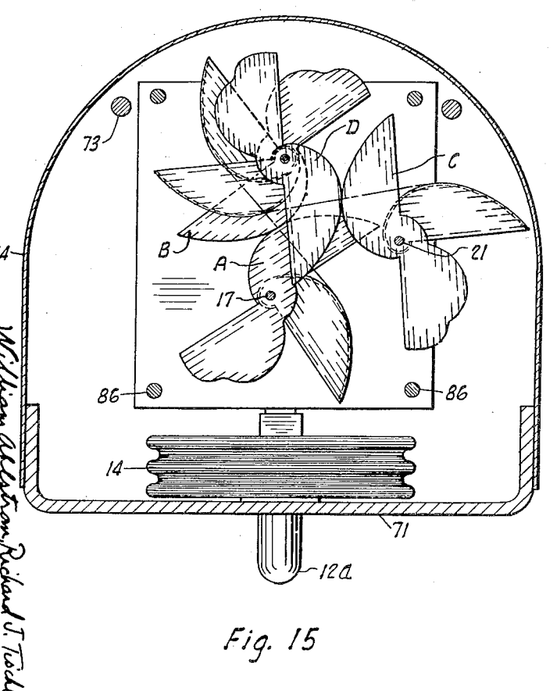
Figures 15 and 16 are cross-sectional views taken, respectively, on the lines XV—XV and XVI—XVI of Figure 13.
Figure 16:
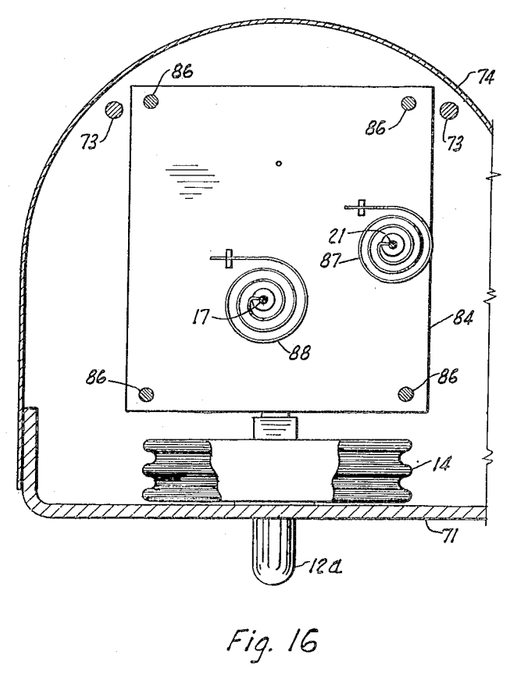

As most clearly shown in Figure 14, dial 19 may be provided with one scale, shown in this figure as at the top indicated by reference character 24, which, being read against a stationary mark 25, indicates directly the gallons per hour being consumed, while dial 23 may be provided with a scale 26, also readable in conjunction with the stationary mark 25, to directly indicate the miles per hour being traveled.

The two dials are also shown as provided with a scale and cooperating mark (27 and 28) by which the relationship of the mileage to the fuel consumption may be directly read, the mark indicating upon the scale the number of miles per gallon being obtained at any given instant.

The calculating mechanism

As above indicated, cams A and B as well as C and D are so designed to transmit motion from a shaft which is rotated in direct proportion to a given variable to a driven shaft which moves in proportion to the logarithm of said variable.

By this arrangement and the use of the concentric dials provided with suitable logarithmic scales, it will be apparent that the dials constitute, in effect, a circular slide rule capable of making calculations between the two variable functions causing the driving of shafts 17 and 21, and also that these functions may be multiplied or divided, depending on the arrangement of the scales and rotation of shafts 18 and 22. It would also be possible, with double sets of cams and with suitable "log-log" scales to solve more involved mathematical calculations. The general appearance of the cams and scales necessary for such operation would be substantially the same as those diagrammatically indicated in Figures 1 to 9, so that their operation will be readily understood from an inspection of these figures.

The details of the camming elements are clearly shown in Figures 2 to 7 of the drawings, in which it will be noted that all four cams may very conveniently be identical in shape and size.

Each cam assembly consists of a contacting surface 29 of any desired width and formed into a section of a logarithmic spiral. This logarithmic spiral bearing surface of the cam A, of course, engages the similar logarithmic spiral bearing surface of the cam B, and, due to the characteristics of such surfaces, these roll upon each other, eliminating wear, friction, and other accuracy-impairing features, which would be present in the use of a single cam.

This elimination of sliding contact and substitution therefore of purely rolling contact not only reduces the wear and inaccuracies in operation, but also permits driving of cam B by cam A with a minimum amount of force.

Both cams are provided with a counterbalance portion 31 which offsets the mass of the portion 30 thereof, as well as that of the part 32 about to be described, so that no gravitational forces need be overcome with the cams in any position.

Parts 32, shown in general at right angles to parts 30 and 31, are slightly offset axially with respect to the cams and each is provided with a grooved edge 33 for the reception of a flexible connector 34 such as a cord, band or the like. The surfaces 33 are so grooved that the center line of the flexible connecting element in aligning itself in these grooves follows the same or a similar logarithmic spiral as that shown at 29, and a slight tension upon the connector 34 maintains surfaces 29 at all times in contact.

A feature of this means of maintaining the cams in contact is that it eliminates any reacting torsional forces which might otherwise impair the accuracy of the device, as all forces are equal and opposite in action at all angular positions throughout the operating range of the cams. Thus each cam is at all times in neutral equilibrium, and, irrespective of the position in which it is set, has no tendency to roll to any other position. Its movement is caused only by its actuator, and there are no outside forces tending to move it and so impair the accuracy of its response to any motion of the actuator.

Figures 5, 6:
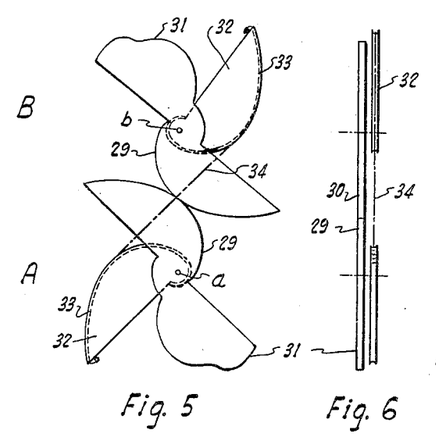
Figure 7:
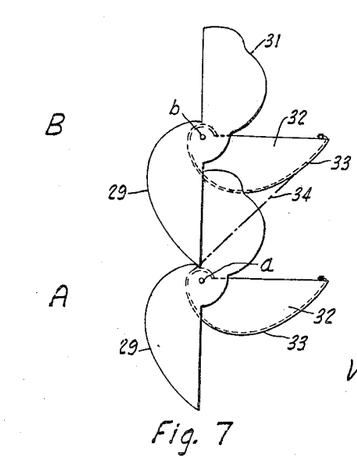

Thus, it will be apparent from an inspection of Figures 5 and 7, in the former of which surfaces 29 are shown as in contact at about equal radial distances from their pivot points A and B and at about one-half of the maximum radius of each of the cam surfaces, connector 34 is also tangent to parts 32 at about equal distances from the pivot points and about one-half of the maximum radius of surfaces 33.

In Figure 7 surface 29 of cam A is seen in engagement with cam B at the minimum radial distance of the first mentioned surface, while the contacting point is at the maximum radial distance of surface 29 of cam B. Similarly, flexible connector 34 is tangent to groove surface 33 of cam A at its minimum radius, and to surface 33 of cam B at its maximum radius.

The use of the two cams further permits rotation of both the driving and driven cams through 180°, while maintaining accurate relationship of the shafts to which both cams are secured, thus permitting the scales on the dials to be spread out through one-half of the periphery of each dial, making the divisions thereof relatively far-spaced and easily read.

Figure 8:
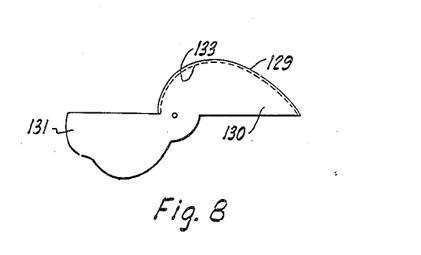
Figures 8 and 9 are similar views of a modified type of cam mechanism also embodying the invention.
Figure 9:
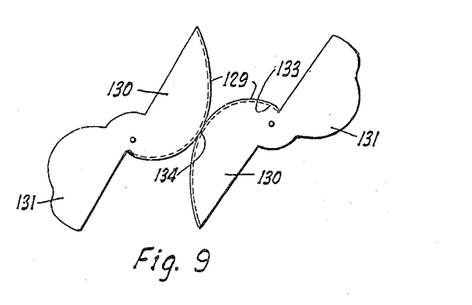

In Figures 8 and 9 are shown cams operating upon the same principle as those of Figures 2 to 7, but in which the separate elements 32 have been eliminated. These cams each consist of a main or contacting wing 130 and a counterbalance portion 131. The wing 130 has a logarithmic spiral contacting surface 129 which is centrally grooved as indicated at 133 for the reception of a flexible connecting element 134 which holds the surfaces 129 always in contact.

The operation of these cams is like those above described, in that the two logarithmic spiral surfaces 129 roll upon each other without slippage while reacting torsional forces are eliminated, because of the concurrent and equal change in radius between the contacting points of surfaces 129 and of the flexible element with grooves 133.

It will also be apparent that instead of the flexible connector between cams, a spring might be used urging the driven cam always into contact with the driving cam, but that for maximum accuracy the spring should be designed so that its deflection will exert only such applied force as to overcome friction and cause the driven cam to follow the driving cam and also so that the force exerted by the spring should be so proportioned to the respective radii of the two cams as to produce torsion upon the driving shaft which will not introduce substantial error.

While the cams in Figures 2 to 7 have been referred to as A and B, it will be understood that cams C and D, respectively, operate in the same manner and are of the same type as are cams A and B.

*Fluid measuring device*

As above mentioned, one of the variable elements which enters into the calculation of the device of Figures 13 to 16 is the quantity of fuel furnished to an internal combustion motor and which is caused to actuate cam A.

A substantially constant gravitational head or pressure is maintained upon the liquid fuel by the valve 4 and float 5, which maintain the level of this fuel in float chamber 3 at a fixed distance above the pipe 11 through which the fuel is drawn to the carburetor of the engine.

As greater demand is placed upon the carburetor to supply fuel to the engine, more suction will be imposed upon the liquid contents of pipe 11, and this suction, being transmitted through pipe 12 to bellows 14, causes the bellows to collapse in proportion thereto, rotating shaft 17 through connection 15 and drum 16, and actuating cam A.

It is important that the movement of the head of bellows 14 be in exact and direct proportion to the flow of liquid through pipe 11, and inasmuch as the flow through a fixed orifice is not directly proportional to the difference in pressure existing on both sides, it is necessary to provide a passage for the liquid which will vary in cross-sectional area in such a manner that the flow of liquid through pipe 11 will be directly proportional to the pressure or suction existing in this pipe.

It is also essential that differences in the flow be accurately reflected in the pressure in pipes 11 and 12 throughout a range covering the entire operability of the device, and particularly is it difficult to maintain with previous devices this accuracy when very small quantities of liquid are passing, as when the engine is idling or operating at light loads.

To overcome these difficulties, there is provided a device having an orifice of variable area, together with means for automatically varying the area, so that the pressure in pipes 11 and 12 is at all times directly proportional to the amount of liquid passing through pipe 11.

In the embodiment illustrated in Figures 1 and 10, there is provided within the casing 8 a bellows 9, the interior of which communicates with pipe 11. Fluid is permitted to pass to the interior of the bellows through a bushing 50 sealed about a perforation shown as in alignment with the end of pipe 11, and extending into this bushing is the end of an orifice restricting member or spaced plug 10 shown as tapering generally conical shape and somewhat more acute than the surrounding conical aperture of bushing 50. The plug has a threaded shank 51 threaded into the boss 52, welded or brazed to the casing 8, which is also externally threaded to receive a packing gland 53. The plug, of course, may be readily rotated to adjust it axially with respect to bushing 50 by a knurled or similar head 54.

A leafspring 55 is secured by means of a screw 56 and bracket 57 to the casing and has its upper end forked to enter an annular recess 58 formed in bushing 50, and arranged to move this bushing in the direction of the plug, opposing the pressure of the liquid surrounding the bellows 9 and inside the casing 8.

It will be apparent that as the suction of pipe 11 increases, the walls of bellows 9 tend to collapse and to move the bushing 50 to the right (as seen in Figure 10), increasing the conical-annular space between the bushing and the plug and thus permitting a larger cross-sectional stream of liquid to pass to the interior of the bellows and the pipe 11.

It will be understood that to obtain this result the strength of spring 55, together with the pressure exerted by the walls of the bellows itself, must be carefully calibrated, and that the orifice of bushing 50 and the point of the plug 10 must be so designed that the area of the annular opening between them is always equal to $$\frac{F^2}{2GH}$$

(where F is the flow measured in units of volume per unit of time, G is the acceleration due to gravity, and H is the pressure differential between pipes 7 and 11).

Figure 11 shows another form of liquid-flow-pressure-controlling device, in which the orifice controlling the flow of fluid is made in the form of a venturi 150 constituting the end of the liquid discharge pipe 112, while into the throat of the venturi projects a tapered valve-like member or plug 110 carried by a bellows 109, to which it is attached by means of an annularly grooved boss 158.

The tapered plug causes the area of the Venturi throat to vary automatically, so that the pressure differential from the throat to either end of the venturi is directly proportional to the flow of the fluid through the tube.

This form of device has an added advantage in that the velocity energy imparted to the fluid during its approach to the throat is regained from the throat to the outlet of the tube, and therefore the flow of fluid through this device will be proportional to the square root of the pressure differential from the entrance to the outlet of the tube.

With the device so designed that the cross sectional area of the throat varies with the $$\sqrt{\frac{F^2}{2GH}}$$

the pressure differential from the throat to either the inlet or outlet varies directly with the flow.

The bellows is enclosed within a casing 108 and assisted in remaining in expanded position by a spring 155 attached by screw 156 to a bracket 157 fastened to the interior of the casing. Liquid enters through supply pipe 107.

Pressure within the bellows 109 and at the throat of the venturi is equalized by a bypass-like tube 160. Another tube from pipe 160 extends to the pressure responsive device and the dial actuating mechanism of the instrument. This instrument may also be connected, if desired to pipe 111 and pipe 160, if a two tube pressure responsive device is used.

Figure 12:
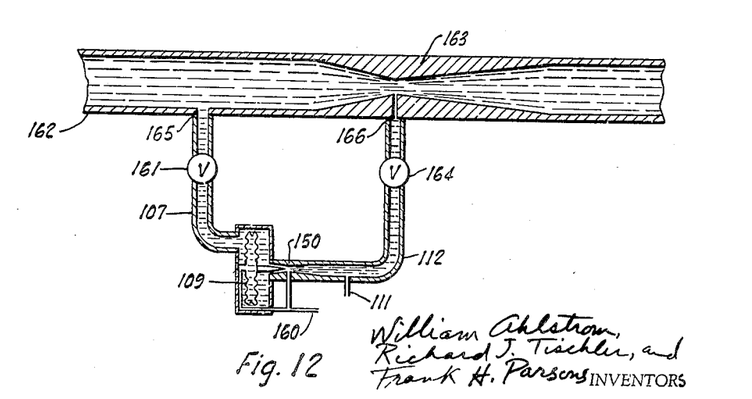
Figure 12 is a similar view of a fluid flow responsive device such as that illustrated in Figure 11, showing the manner of its application to a large fluid conduit.

In Figure 12, an application of a device such as shown in Figure 11 to a large conduit conveying too much fluid to pass through venturi 150 is illustrated. The parts are similar to those just described, with tubes 160 and 111 leading to the indicating part of the instrument, but tube 107 is now connected through a valve 161 to one side of a larger conduit 162 in which is placed a larger venturi 163 and the tube 112 is connected to the throat of this venturi through a valve 164. Of course it will be apparent that the device of Figure 12 may be used to actuate any desired or known type of instrument by which the flow of liquid may be determined, or by which an apparatus may be controlled in accordance with this flow, and that the apparatus may be of an indicating nature or provided with any desired recording instrument or the like.

This arrangement is an improvement over any other known method, in that the head for operating the indicating or recording instrument is many times greater than, and also varies directly with, the flow. The fluid flowing through the Venturi tube produces a "velocity head" between 165 and 166 which is proportional to the square of the flow, while the flow of fluid through a bypass 107 and 112 varies as the square foot of the differential. Therefore the flow through the bypass, and that is through the measuring device, varies in direct proportion to the flow of the fluid in the main conduit.

In this device the operation is based upon the theory that the ratio of the flow in conduit 162 to that in conduits 107 and 112, being connected in parallel, is constant for all the heads or pressure differences, irrespective of the resistance of the conduits.

Therefore, the flow through conduit 162 may be accurately indicated by measurement of the flow through conduits 107 and 112, and the latter, as above described, may readily be interpreted from the pressures in tubes 111 and 160.

*The registering device*

The registering or indicating device shown in Figures 13 to 16 has already been partially described in conjunction with the preceding figures. The parts of this mechanism are shown as mounted upon a panel 70, such for instance, as the dash or instrument board of a vehicle.

The cams A, B, C, and D and their operating mechanisms are enclosed in a housing consisting of a supporting frame including an L-shaped piece 71, a back 72 connected therewith as by pillars 73, and a cover 74, while the dials are enclosed within the space formed by a crystal 75 supported by annular ring 76 secured to the front face of the panel 70.

Figure 13:
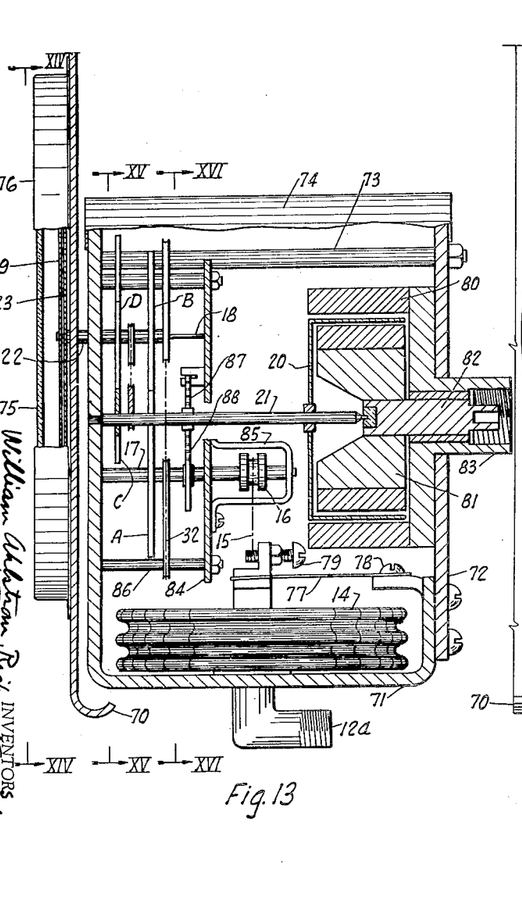
Figure 13 is a central sectional view of the completed device shown diagrammatically in the upper part of Figure 1.

Shafts 18 and 22 pass through the panel 70 and frame bracket 71 to the space enclosed within the frame and cover.

The bellows 14 is situated within the bottom of the frame and connects to a pipe fitting 12a to which the upper end of pipe 12 may be readily secured.

A spring 77 secured by screw 78 to the frame serves to control the expansion and contraction of bellows 14 while flexible band 15 is shown adjustably connected to a screw 79.

The drum 20 of the speedometer mechanism is shown as positioned between stationary 80 and rotary 81 element of the usual speedometer mechanism, the latter being driven by a flexible shaft (not shown) which will engage, in a manner well understood in the art, with the clutch member 82, and be encased in a flexible conduit connected to boss 83 projecting rearwardly from back 72 of the frame.

Auxiliary supporting plates 84 and 85 and pillars 86 support the various shafts and mechanism and provide means for fastening stationary ends of two spiral springs 87 and 88, which impose a slight torsion on shafts 17 and 21 for purposes of properly calibrating the rotation thereof.

While we have described the illustrated embodiments of our invention in some particularity, obviously many other embodiments, variations, and modifications thereof will readily occur to those skilled in this art, and we do not therefore limit ourselves to the precise details shown and described herein, but claim as our invention all embodiments, modifications and variations coming within the scope of the appended claims.

We claim:

1. In a calculating device, a machine element comprising a pair of logarithmic spiral cams bearing upon each other, a pair of logarithmic spiral sheaves, one fixed to each of said cams and angularly displaced in regard thereto, and a flexible connector passing over said sheaves and urging said cams against each other, the sheaves being so displaced with respect to the cams that the connector at all times passes through a line parallel to the axes of the cams and through their point of contact.

2. In a calculating device, a machine element comprising a pair of logarithmic spiral cams bearing upon each other, a pair of logarithmic spiral sheaves angularly displaced ninety degrees from the cams, one fixed to each of said cams and offset in regard thereto, and a flexible connector passing over said sheaves and urging said cams against each other.

3. A calculating device comprising two contacting logarithmic spiral cams, a groove formed in each of the cams adjacent and offset from its contacting surface, a flexible connector having portions in said grooves and having an end fixed with relation to each of said cams, the connector exerting a tensile force holding the contacting surfaces of the cams together and exerting on each cam a torque equal and opposite to that exerted by the pressure of the cams upon each other.

4. A calculating device comprising two rotatably supported logarithmic spiral cams rotatable about parallel axes and capable of rolling without slipping on each other, the logarithmic spiral surfaces of the cams directly contacting each other, means exerting a constant force pressing the cams upon each other and axially offset from the contacting surfaces thereof, means for moving the point of the application of the force as the cams rotate receding from and approaching their axes at the same ratio as do their points of contact.

5. In a calculating device, a machine element comprising two contacting logarithmic cams, pressure applying means maintaining said cams in contact, means moving the point of the application of the pressure as the cams rotate causing the pressure always to pass through the point of contact of the cams in a direction normal to their contacting surfaces.

6. In a calculating device, a machine element comprising a pair of logarithmic spiral cams bearing upon each other, a pair of logarithmic sheaves one of which is fixed relative to each cam, and a flexible connector passing over said sheaves urging said cams against each other.

7. In a calculating device, a machine element comprising a pair of logarithmic spiral cams bearing upon each other, a pair of logarithmic sheaves one of which is fixed relative to each cam and offset 90° therefrom, and a flexible connector passing over said sheaves urging said cams against each other.

8. In a calculating device, a machine element comprising two rotatably supported logarithmic cams capable of rolling without slipping on each other, pressure applying means exerting a constant force pressing the cams upon each other, means moving the point of application of the force as the cams rotate from and toward the pivots of the cams at the same ratio as do their points of contact, the direction of the force at all times being normal to the contacting surfaces of the cams.

WILLIAM M. AHLSTROM.
RICHARD J. TISCHLER.
FRANK H. PARSONS.

CERTIFICATE OF CORRECTION.

Patent No. 2,250,739. July 29, 1941.

WILLIAM M. AHLSTROM, ET AL.

It is hereby certified that error appears in the printed specification of the above numbered patent requiring correction as follows: Page 4, first column, line 62, for "square foot" read -- square root --; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.